Figure 1:
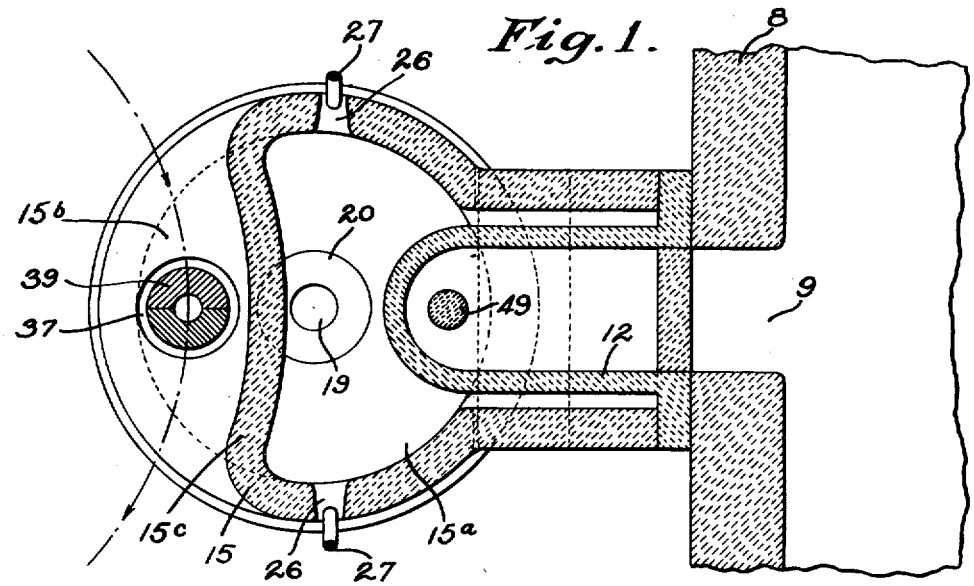

Nov. 28, 1933.  K. E. PEILER  1,937,479
GATHERING POOL
Filed Jan. 15, 1929

Witness:
A. A. Horn

Inventor
Karl E. Peiler
by Arthur D. Brown
Attorney.

Patented Nov. 28, 1933

1,937,479

UNITED STATES PATENT OFFICE

1,937,479

GATHERING POOL

Karl E. Peiler, West Hartford, Conn., assignor to Hartford-Empire Company, Hartford, Conn., a corporation of Delaware Application January 15, 1929. Serial No. 332,650

13 Claims. (Cl. 49—56)

My invention relates to the art of supplying molten glass for mold charges, which are to be fabricated into individual articles. More particularly, my invention provides a method and apparatus for presenting a suitable supply or bath of molten glass in a suitable condition for gathering by suction gathering apparatus, such as suction molds or cups.

In gathering molten glass by suction gathering mechanism from a bath or gathering pool, it is essential not only to maintain the glass in proper heated condition for gathering, but also to maintain the desired level of the surface of the bath, so that the suction gathering molds or cups may dip to the desired extent beneath this surface level. In order to maintain the glass in the desired condition at the gathering point, a gathering pool in the form of a cylindrical revolving pot is generally used. Glass is supplied to the revolving pot from a melting furnace by flowing the glass through a spout from the furnace into the revolving pot. The glass in the revolving pot is kept hot by fuel supplied to a fire space enclosed by a cover which extends over the greater portion of the revolving pot. A portion of the pot projects beyond the cover, so as to expose a portion of the glass surface to give access for suction molds or other suction gathering receptacles. The exposed portion of the glass is not only chilled by its exposure, but also by the chill caused by contact of the suction molds or receptacles and of the shears which are customarily employed to sever the gathering mold charges from the glass bath in the revolving pot or gathering pool. The revolving of the pot brings the chilled portion of the glass under the cover where it is subjected to heat and reheated to the desired consistency. It also presents a fresh, properly heated portion of glass in a projecting portion of the pot, for gathering by the succeeding mold or receptacle.

The level of the glass in the revolving pot is generally regulated by means of a vertically adjustable gate in the flow spout from the melting furnace to the revolving pot. As glass is removed by the suction gathering mechanism, it is replaced through the flow spout, under control of the gate. An excess supply of molten glass from the spout will gradually raise the level of the glass in the pot, whereas an insufficient supply will gradually lower the level of the glass in the pot. It is, therefore, desirable, with the level at the proper point, to regulate the supply carefully to maintain this level. In ordinary operation, the level of the glass in the revolving pot is subjected to variation from various factors, such as failure of a mold or receptacle to remove its quota of glass, variation in the level of the glass supply in the melting furnace, variation in the viscosity of the glass supply, and other accidents of operation of the suction gathering mechanism. It is, therefore, necessary in ordinary operation to adjust the supply control gate at rather frequent intervals to maintain the level in the revolving pot at the desired point.

In order to minimize the variation of glass level in the revolving pot, and hence the frequency of gate adjustment, the revolving pot is generally made ten or twelve feet in diameter. This presents a large area whose level fluctuates less rapidly than would a smaller area. With the present system of heating the revolving pot and supplying glass to it, it is also desirable to have the revolving pot of a large diameter so as to present a sufficient area for bringing the glass to the desired temperature for proper gathering by the suction gathering mechanism, and also for reconditioning or reheating the chilled portion of the glass. Such a large pot requires a large amount of fuel to heat it, and involves a relatively great investment.

It is an object of my invention to provide a gathering pool or pot for presenting a suitable supply of molten glass for use with suction gathering molds or receptacles. A further object is to provide a gathering pool or revolving gathering pot and method of operation thereof for minimizing the fluctuation in level of the surface of the glass in the pool or pot. A more specific object is to provide a revolving gathering pot and a method of operation thereof, whereby the pot may be made smaller than usual and less fuel will be required to heat it. A further object is to provide, in combination with a gathering pool or revolving gathering pot, a novel cover and heating means for controlling the temperature of the glass in the gathering pool or pot as desired, and for reheating or conditioning the glass which has been chilled in the exposed portion of the pool or pot. A further object is to provide in combination with such a gathering pool or pot, a novel glass supply controlling device between the melting furnace and the pool, for the purpose of controlling or regulating the temperature of the glass supplied to the pool independently of the furnace conditions, and for controlling the quantity of glass supplied to the pool, whereby to assure the maintenance of the proper level of glass in the pool at the proper consistency for the gathering operation.

Figure 2:
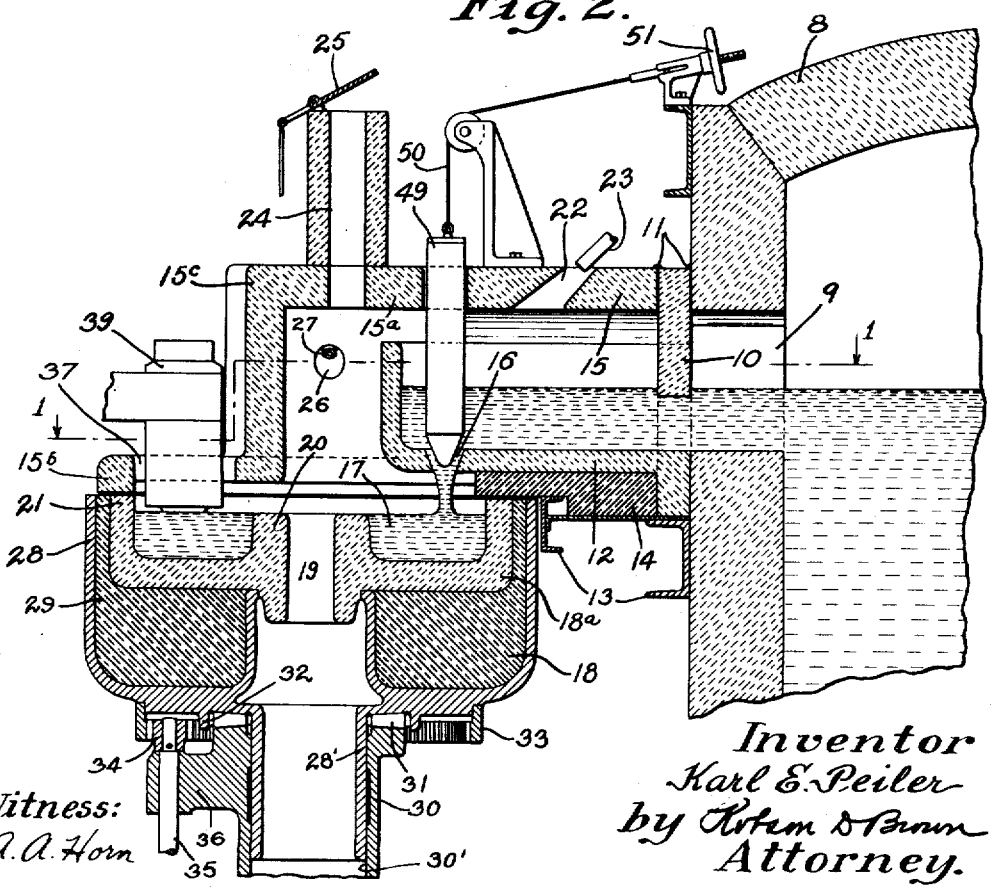

One embodiment of the mechanical features of my invention is shown in the accompanying drawing in which:

Figure 1 is a view in section, taken on the line 1—1 of Fig. 2, of apparatus embodying my invention; and Fig. 2 is a vertical section of such apparatus.

Generally speaking, I provide a relatively small gathering pot adapted to rotate about a vertical axis provided with an overflow adjacent its axis of rotation and constantly supplied with glass from a suitable conditioning forehearth or extension of a furnace, at a rate sufficient to maintain the level in the pot substantially constant in spite of withdrawals by the gathering apparatus. The forehearth and pot are suitably covered and enclosed by a heated cover or chamber provided with controllable heating means for maintaining the glass at proper viscosity. The forehearth and cover are preferably sealed off from the furnace above the glass line and are supplied with an independent draft controlling means to permit accurate control of the temperatures of the glass in the forehearth and pot independently of the heat and draft conditions in the furnace.

Referring particularly to the drawing, 8 represents a portion of the usual continuous tank for melting and refining glass, provided with an opening 9 through which the glass may pass to a refractory forehearth or trough 12. The forehearth is supported on suitable bearing bars 13 and is provided at its bottom with insulation 14. A refractory cover or housing 15 is provided above and about the sides of the forehearth 12, being spaced from the upper edges and side walls of the forehearth. A sealing gate or block 10, extending downwardly from the cover 15 into the glass, is provided to close that portion of the opening 9 which is above the glass level. The joints between the block 10 and the top and sides of the cover and forehearth are filled with clay luting 11 to insure the independence of the draft conditions within the cover from those in the furnace. The forehearth 12 has a downwardly opening discharge orifice 16 through which glass flows into a bath 17, maintained in a rotary pot 18. The rate of flow through the opening 16 is controlled by a suitable plug or regulating valve 49, which is suspended from above, as by cable 50, and is made adjustable toward and from the outlet by a suitable adjusting nut arrangement 51.

The cover 15 comprises an inner portion 15a, adjacent the furnace, of substantial vertical depth and which surrounds the forehearth and extends therebeyond to cover the major portion of the rotary part 18, and an outer portion 15b, of relatively slight depth and which covers the remaining portion of the pot 18. These portions are connected by a wall 15c which is shaped to conform to the path of travel of the gathering mechanisms in order that these mechanisms may pass over the portion 15b of the cover. If the gathering mechanism is of the intermittently rotating type, the outer portion 15c of the cover is provided with a circular opening 37 through which the suction mold or cups 39 may be dipped into the glass. If the gatherer is to be continuously rotated, the opening 37 should be replaced by an arcuate opening of suitable length or the outer cover 15b should be omitted.

The cover 15 is provided with a suitable opening 22 for a burner 23 arranged to direct a flame into the space above the forehearth. It is also provided with other openings 26 for burners 27 which supply heat about the forehearth and over the bath 17. Preferably, the supplies of fuel to the burners 23 and 27 are separately controlled. The draft conditions in the space under the cover 15 are controlled, preferably independently of those in the furnace, by a stack 24 having a regulating damper 25. By these provisions, the heat conditions in and about the forehearth and pot may be accurately controlled and maintained, and thus the viscosity and rate of flow of the glass to the pot may be maintained constant with a minimum adjustment of the valve 49. Also, the condition of the glass in the pot may be maintained and controlled independently of variations in the furnace.

The rotary pot 18 comprises an annular refractory basin 18a, having a central opening 19. The inner wall 20 of the basin is lower than its outer wall 21. The refractory basin 18a is carried by a suitable metallic frame 28, and is insulated therefrom by insulation 29. This insulation minimizes the loss of heat from the lower and outer portions of the bath and assures the maintenance of a bath of substantially uniform temperature and viscosity. The frame 28 is rotatably mounted on a base 30. A cylindrical depending portion 28' of the frame fits within a cylindrical opening 30' in the base, which acts as a large bearing for the pot. The opening in the part 28' is in axial alignment with the overflow opening 19. The part 28' should be of relatively large bore, to prevent the overheating of the bearing members from the glass overflowing the pot. If desired, the parts 28' and 30' may be water cooled. The vertical thrust is borne by suitable bearing rollers 31 housed in ways provided in the lower part of the frame 28 and the upper part of the base 30. A depending annular rib 32 on the frame 28 serves to complete the housing. Rotation of the frame 28 and pot 18 is obtained through a depending internal ring gear 33 which meshes with a pinion 34, carried by a shaft 35, journaled in a bracket 36 upon the base 30. The shaft 35 is suitable driven from a source of power (not shown).

It is to be noted that the glass in the gathering pot is exposed to the chilling effect of the outside atmosphere only at the small circular opening 37, and except for this, is at all times in the controlled heated atmosphere maintained in the cover 15.

It will be seen that I have provided means by which a relatively small and economical rotating pot may be used in the suction gathering process, which minimizes or eliminates the difficulties heretofore attendant upon the use of small pots for this purpose. My provision for the accurate control of the temperature and viscosity of the glass in the forehearth and in the pot eliminates many of the usual causes of variation in the glass level in the pot, such as reduced or increased flow to the pot, or such incomplete filling of molds as may be caused by variations in viscosity of the glass. The provision of my novel form of pot, having an overflow, eliminates others of the causes of variation in the level of the glass in the pot, as for instance, the failure of one or more of the gathering mechanisms to effect their gathers. The overflow also insures against injury to the mechanism in case of accident or of an abnormal operation.

The operation of the device above described may be as follows: The glass from the furnace 8 passes continuously under the sealing block 10

10 into the forehearth 12, the block 10 acting additionally as a skimmer to prevent the passage of scum or floating particles into the forehearth. The glass is maintained in the forehearth at a suitable head and is there subjected to an independently controlled heat conditioning which assures the maintenance of the desired viscosity, irrespective of variations in the heat conditions in the furnace. The glass flows from the forehearth to the pot through the opening 16 at such a rate as to just compensate for the glass withdrawn by the normal operation of the gathering device, this rate of supply being assured by the proper setting of the valve
49. Preferably, the glass is maintained in the pot 18 at a level very slightly below the top of the inner wall 20. The pot is rotated at suitably selected speed in order that fresh surfaces of glass of the proper viscosity may be presented to the successive gatherers, and that the chilled glass resulting from a previous gather may be returned to be reconditioned by the heat supplied under the cover 15.

The gathering mechanism, indicated by the gathering head 39, may consist of one or more suction gathering cups or suction gathering molds, which may be mounted for rotation about the center of a fabricating machine, as indicated by the arrows, Fig. 1. The gathering cups or molds are presented in succession to the opening 37 and are there dipped into the bath 17, suction is applied and suitable gathers made. The cups are then lifted from the bath and severing means (not shown) sever the connecting glass and the string of chilled glass falls back into the pot.

As the head of glass in the forehearth is dependent on the head in the furnace, (which head does not vary appreciably because of the large supply of glass maintained in the furnace) and as the viscosity of the glass is accurately controlled in the forehearth independently of the normal variations in the furnace, little or no adjusting of the valve 49 should be necessary to assure the proper supply to the pot and the maintenance of the glass level therein. If one or more of the gathering devices should fail to operate, or if for any other reason the level of the glass in the pot should tend to rise, the surplus glass will promptly overflow the wall 20 and the desired level will be automatically restored.

My device may also be operated to advantage in some circumstances as where it is desired to use a pot of extremely small size by providing that the rate of flow of glass into the pot be slightly greater than that necessary to compensate for the normal withdrawals of glass by the gathering mechanism. Thus the glass constantly tends to overflow the wall 20. As a gathering cup or mold subtracts a relatively large charge at an immediate rate in excess of the rate of supply from the forehearth, the fluctuation in the level of the glass in a very small pot might be excessive, were it not for the surplus or overflow of glass from which the excess required by the cup or mold is supplied. Thus the fluctuation caused by each gathering may be made to become merely a fluctuation of the overflow, while the level of the glass at the succeeding gathering point remains substantially the same. If the pot is very small and is put to a fairly heavy service, it may prove difficult to maintain the individual portions of the bath in the heated atmosphere long enough to recondition the chilled spots caused by the gathering. In such cases, the use of a continuous overflow is particularly useful in that there is always a slight gradient downwardly toward the central overflow opening, which tends to carry the chilled glass away from the gathering point. It is obvious that my invention may be used with a suction gathering device which is intermittently projected toward the pot in a straight line, as well as with a rotary device. It is also readily adaptable for use with a continuously rotating gathering device.

While the overflow centrally of the pot is preferably provided as an aid to the maintenance of level and conditions of the glass and is especially useful to such ends when small pots are used, such provision is also useful with gathering pots in general, as it assures against overflow of the glass from the outer portions of the pot, which might result in serious clogging of and injury to the mechanism.

The use of the terms "large" and "small" as applied to gathering pots in the specification and in the claims does not necessarily refer to the actual dimensions of pots without regard to the service to which they are applied. When a pot is said to be "small", that expression is intended to mean that the pot is substantially smaller than the pot used in commercial practice for the same type of operation. In other words, the relative "largeness" or "smallness" of a pot must be considered with respect to the number and size of the gathering molds with which it is to operate and the speed of the operation. For example, if a pot having a diameter of ten feet is now required to supply an eight-mold section machine running at twenty charges a minute of a particular size, then a pot of nine feet in diameter when used to supply the glass to the same machine running at the same speed and using the same molds would be a small pot, though a pot of this diameter might be considered a large pot if considered in connection with another operation.

The apparatus of my invention may be modified in numerous particulars without departing from the spirit of the invention as expressed in the appended claims.

I claim:

1. Apparatus for gathering mold charges of molten glass by suction, which comprises a rotary gathering pot, means for rotating the pot, means for gathering charges therefrom, means for supplying glass to the pot, and means for conducting a controlled overflow of glass from the pot while the pot is rotating to insure the maintenance of the level of glass in the pot below a predetermined point.

2. Apparatus for gathering mold charges of molten glass, which comprises an upwardly facing annular gathering pot, means for rotating the pot about a vertical axis, suction gathering means adapted to gather charges from the pot, means for supplying glass to the pot, and means for directing an overflow from the pot centrally of the annulus.

3. In combination with a glass gathering pot, means for gathering mold charges by the suction method from the surface of the glass in said pot at a predetermined level, said pot comprising an open-top basin of annular cross section, the inner wall of the basin being lower than the outer wall thereof, and means for supplying glass to said pot, said inner wall constituting a weir for the overflow of the glass supplied thereto in excess of the amount of glass removed from the glass in said pot by the said gathering means.

4. A rotary glass gathering pot for use in gathering mold charges by the suction method, comprising a support mounted for rotation about a vertical axis, and having a large hollow bearing, an annular refractory basin carried by said support and provided with inner walls lower than its outer walls, and having a central passage in axial alignment with the opening in the bearing for the overflow of glass from the basin through the bearing.

5. Apparatus for gathering mold charges of molten glass by the suction method, which comprises a gathering pot, means for rotating the pot, means for periodically gathering mold charges by suction from the pot, a cover for the pot, heat regulating means associated with the cover, means for continuously flowing molten glass into the pot in amounts at least equal to the withdrawal of the glass therefrom by the gathering means, the said pot being provided with a central overflow passage and walls between such passage and the bath of glass, said walls being lower than the outer walls of the pot.

6. In combination with means for gathering mold charges by suction, a rotary pot having a glass containing basin of annular form the inner wall of said basin being lower than the outer wall, means for rotating the pot, and means for supplying molten glass continuously to the bath at a rate at least sufficient to supply the glass as it is withdrawn by the gathering mechanism.

7. In combination with a suction gathering device, means for presenting to the gathering device a bath of glass of suitable viscosity and predetermined level, said means comprising a melting tank, a forehearth connected to the tank and receiving a supply of glass therefrom, a discharge opening in the forehearth, a rotary pot for receiving glass discharged through the opening, means for separating the space in the forehearth above the glass from the space in the tank above the glass, means for heating the space above the glass in the forehearth, means for regulating the draft condition in said space independently of the draft condition in the furnace, and means for adjustably controlling the flow of glass through the discharge opening in the forehearth.

8. In combination with a suction gathering device, an annular pot adapted to continually present a bath of glass of constant level to the gathering device, means for rotating the pot and means for continuously supplying glass of suitable viscosity and temperature to the pot, said last named means comprising a continuous melting tank, a forehearth connected thereto and having a discharge orifice in its bottom, means for adjustably varying the effective area of the orifice, and means independent of the draft conditions in the furnace for heating the glass in the forehearth and pot.

9. The method of segregating mold charges of molten glass which comprises, establishing a bath of molten glass of suitable viscosity in a pot, rotating the pot about a vertical axis, periodically gathering individual charges from the bath by suction, supplying glass to the bath in amounts at least equal to the normal withdrawals of glass therefrom, and causing a controlled overflow of glass supplied in excess of the actual withdrawals.

10. The method of segregating mold charges of molten glass which comprises, establishing a bath of molten glass of suitable viscosity in an upwardly facing rotary pot, rotating the pot about a vertical axis, periodically gathering individual charges from the bath by suction, supplying glass to the bath in excess of the withdrawals of glass therefrom, and creating an overflow of the excess glass adjacent the axis of rotation of the bath.

11. The method of gathering mold charges of molten glass by suction which comprises, creating an annular bath of molten glass, periodically subtracting relatively large quantities of glass therefrom by sucking the glass into gathering receptacles, and maintaining the level of the bath substantially constant by supplying molten glass thereto in excess of the subtractions and causing the excess to flow from the bath internally of the annulus.

12. The method of gathering mold charges of molten glass which comprises, establishing a bath of molten glass in an upwardly facing annular container, rotating the container about a vertical axis, periodacally moving gathering receptacles into the bath, sucking mold charges into said receptacles, severing the gathered glass from the bath, returning the severed ends to the bath, and removing the severed ends from the gathering zone and maintaining the level of the bath by flowing glass into the container in excess of the withdrawal by the gathering receptacles and flowing the excess out of the container centrally of the container.

13. The combination of a melting tank and a rotary working tank of an overflow passage located centrally of the working tank and below the top of the side wall whereby the level of the glass pool is maintained constant.

KARL E. PEILER.